Figure 1:
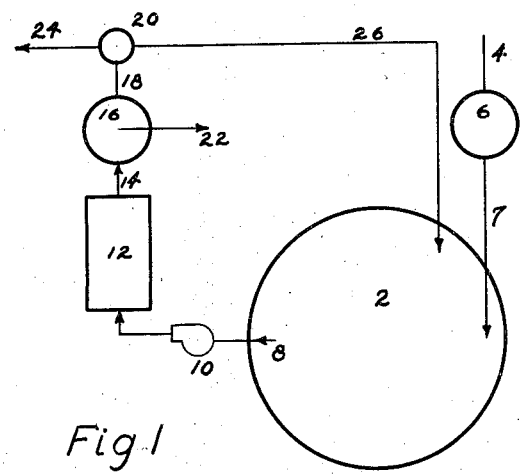

May 18, 1948. H. O. HALVORSON 2,441,813
PROCESS AND SYSTEM FOR TREATING SEWAGE
Filed Feb. 17, 1940

INVENTOR
H. Orin Halvorson
BY
ATTORNEY

Patented May 18, 1948

2,441,813

UNITED STATES PATENT OFFICE 2,441,813

PROCESS AND SYSTEM FOR TREATING SEWAGE

Halvor Orin Halvorson, St. Paul, Minn.

Application February 17, 1940, Serial No. 319,496

22 Claims. (Cl. 210—7)

1

This invention relates to an improved process and system for treating strong domestic or industrial waste to purify the same to such degree that the waste may be safely discharged into streams or the like without being first diluted by means of relatively pure water from an independent source. It is a broad purpose of the invention to provide such a process and system which are economical to operate and more efficient than those heretofore employed for this purpose. Again, it is an object to provide a process for this purpose which will require an inexpensive system for carrying out the same.

A further object of the invention is the provision of a flexible process and system, whereby seasonal or temporary excesses of sewage may be treated over an extended period of time in a filter or aerating device having a capacity smaller than that which would be required for the peak load under present practice.

Moreover, it is an object of the invention to provide a process for purification of strong wastes involving repeated aerobic treatment of the wastes, and wherein the aerobic treatment is carried out at maximum efficiency.

These and numerous other objects of the invention will become more readily apparent upon a detailed study of the accompanying drawings and specification together with the appended claims.

Treatments of sewage aerobically, as in a trickling filter open to atmosphere or its treatment with activated sludge, are well known methods of treating sewage and are very desirable for use in treating wastes of low strength. These methods may be advantageously used in the treatment of wastes having a strength of less than substantially one thousand B. O. D. but heretofore their use in the treatment of stronger wastes has been unattractive from an economic viewpoint. The term "B. O. D." as used herein means five day biochemical oxygen demand expressed in parts per million as used in standard practice. A single passage of strong waste through a standard trickling filter, for example, does not sufficiently reduce the strength of the sewage to make safe its discharge into a stream or the like. Thus the effluent resulting from a single passage of strong sewage through the filter must either be diluted with relatively pure water before discharge, or must be additionally treated for further purification. In order to effect such additional purification it has been proposed to recirculate the effluent through the filter or pass it through a series of other filters in stages. However, such recirculation or stage treatment has not proved successful heretofore. In the case of very strong waste it is as a rule impossible under present methods to obtain sufficient reduction in B. O. D. to make safe the final discharge of the waste, in spite of multiple recirculations or stage treatments in a trickling filter open to atmosphere, activated sludge apparatus or the like. Moreover, under present methods the percentage reduction in B. O. D. of the waste diminishes with each recirculation or stage treatment, i. e. the efficiency of treatment falls with each recirculation or stage.

These disadvantages of present methods are due to the fact that sewage in its raw state contains matter (hereinafter sometimes referred to as "readily susceptible matter") which is readily susceptible to treatment in a trickling filter open to atmosphere or other aerating device such as an activated sludge apparatus, and other matter (hereinafter sometimes referred to as "relatively unsusceptible matter") which is relatively unsusceptible to such treatment. Thus the first passage of sewage through a trickling filter for example oxidizes and flocculates matter readily susceptible to such treatment but as the sewage is recirculated the proportion of such matter diminishes with the result that decreasing percentages of reduction in strength occur with each recirculation or stage, and the efficiency of the treatment diminishes rapidly because of the rising percentage of relatively unsusceptible matter. In the case of ordinary domestic sewage, the amount of relatively unsusceptible matter originally contained therein is small enough so that after removal of all or a substantial part of the readily susceptible matter, which occurs by reason of a single passage through a filter or the like, the strength of the sewage will be sufficiently low to justify discharging the same into a stream. But in the case of relatively strong industrial wastes, the sewage would still be too strong for final discharge after removal of the originally contained readily susceptible matter.

It is an additional object of the present invention to provide a process and system for efficiently removing relatively unsusceptible matter as well as readily susceptible matter from strong waste by treatment in a trickling filter open to atmosphere, activated sludge apparatus, or other aerating device.

More particularly it is an object to provide an improved process and system for purifying strong sewage in which material relatively unsusceptible to treatment in a trickling filter or the like is converted to a condition in which it is readily susceptible to such treatment.

I have discovered that if sewage is subjected to a prolonged period of detention after treatment in a trickling filter open to atmosphere or other aerating device such as an activated sludge apparatus before being again subjected to such treatment, some of the originally contained matter relatively unsusceptible to such treatment will as a result of the prolonged detention become readily susceptible to the treatment. Recirculation or stage systems in which the sewage is subject to detention for average periods up to six or eight hours between treatments in a trickling filter or other aerating device have heretofore been proposed, but tests have indicated that periods of such short duration are insufficient to convert matter relatively unsusceptible to treatment in an aerating device such as a filter, into a condition in which it is readily susceptible to such treatment. In these processes the percentage reduction in strength for each recirculation does not remain constant and the efficiency of the filter or other device progressively decreases with repeated passages of the liquid therethrough notwithstanding the six or eight hour period of detention. Accordingly, it is impossible to obtain high percentage reduction in B. O. D. of strong sewage even with numerous recirculations or stage treatments.

I have found that an average period of detention of more than approximately one day is necessary for the modification of any appreciable amount of the relatively unsusceptible components to a state in which they are readily susceptible, and the arising of a condition in which the percentage reduction in strength for each passage through the filter or other aerating device remains substantially constant. The present invention contemplates subjecting the sewage to detention for an average of one day or more between successive treatments in a trickling filter, activated sludge apparatus, or other aerating device. The detention may be carried out after removal of settlable solids, or without such removal. If there is too long a period of detention between treatments in the aerating device, there is a tendency for a condition of anaerobiosis to arise in the bulk of the sewage under detention and I have found that the detention period should not exceed an average of approximately fifteen days if odors as a result of anaerobic conditions are to be avoided.

The present invention contemplates preferably subjecting the sewage to an average period of detention of from five to twelve days between successive treatments in a filter or the like. Perhaps the ideal period of such detention is from seven to nine days.

The expense of the old methods and systems is exceptionally high in industries such as the canning industry which have peak seasonal output of sewage. Since there is little or no flexibility in the capacity of plants employing such methods the size and expense of a disposal plant is governed by the peak daily load even though the plant may operate for the rest of the year at only a fraction of capacity, or perhaps not at all. In contradistinction, the present process and system contemplate storage of sewage in large amounts without creating an objectionable nuisance, and purification of such excess in slack periods.

Completely stagnant sewage will in due time become anaerobic in character and possess disagreeable odors even if treated in a trickling filter or the like before being held stagnant. However, I have found that if a small portion of the sewage in a comparatively large lagoon is continually withdrawn, treated under aerobic conditions and recirculated to the lagoon, the bulk of the sewage in the lagoon will remain sufficiently aerobic to prevent arising of objectionable odors. In order to prevent the arising of objectionable anaerobic conditions in a detention reservoir or lagoon for a large amount of sewage, the present invention contemplates the daily circulation of at least about seven per cent of the bulk of sewage held in such detention reservoir or lagoon through a trickling filter open to atmosphere or other desired aerating device such as an activated sludge apparatus.

Figure 2:
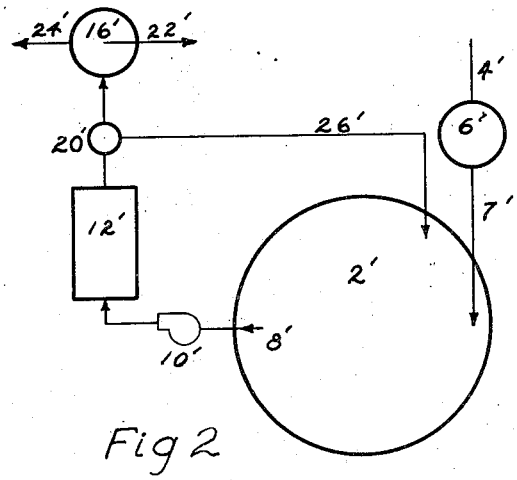

In the drawing, which is merely illustrative of the invention, Figure 1 is a flow diagram of one form of process carried out in accordance with the invention; and Figure 2 is a flow diagram of a modification of this process.

Referring more particularly to Figure 1, numeral 2 represents a storage reservoir or lagoon, which may be circular in plan, and which has a storage capacity at least equal to the total amount of sewage applied each day to the aerating device referred to below. Incoming raw unsettled sewage is supplied through conduit 4 which empties into any suitable primary settling tank 6 in which the settlable solids are removed from the raw sewage which is then led to the reservoir or lagoon 2 by means of conduit 7. In normal operation the reservoir or lagoon is maintained filled with sewage liquid. Liquid is withdrawn therefrom through conduit 8 by means of any suitable pump 10 and supplied to any desired form of aerating device 12 which may be a trickling filter open to atmosphere of standard construction, or an activated sludge apparatus, or the like. The withdrawal of liquid from reservoir 2 preferably takes place above the bottom of the reservoir but at a point sufficiently below the level of the liquid contained therein to preclude the passage of any scum or surface debris through conduit 8. The effluent from the filter or other aerating device 12 flows through conduit 14 into a final settling tank 16 wherein the settlable solids contained in such effluent are removed and may be drawn off through conduit 22 by any suitable means. The liquid from final settling tank 16 flows through conduit 18 to a suitable valve or other device for dividing the flow into two portions, one of which is finally discharged from the system into a stream or the like through a conduit 24, and the other of which flows back to the reservoir or lagoon 2 through conduit 26. The liquid preferably enters conduit 8 at a point in the lagoon substantially opposite the point of discharge of primary influent from conduit 7 as shown. And the conduit 26 preferably discharges into the reservoir at a point adjacent the discharge point of conduit 7 as also shown. The particles of sewage passing from conduits 26 and 7 to conduit 8 when the system is in operation, are subjected to an average period of detention in the reservoir or lagoon 2 under uniform conditions of operation. The opposite arrangement of the discharge ends of conduits 26 and 7 and the inlet end of conduit 8 as stated above, minimizes variation from this average.

In most instances, primary settling tank 6 will be found highly desirable because in its absence, the settable solids of the raw influent will be deposited in the large reservoir or lagoon 2 from which it would be very difficult to effect their removal and prevent the arising of objectionable anaerobic conditions. This is especially true of a plant operating all year round without prolonged rest periods during which settled solids could be removed from the storage reservoir or lagoon. So also it is desirable to provide means as shown for removing settable solids from the filter or other aeration effluent returned to the reservoir although this is not so important in some instances of plants such as canning plants handling only seasonal wastes. This matter will be more fully discussed in connection with the modified flow diagram of Figure 2.

Any desired practice may be followed in applying the sewage liquid from reservoir 2 to the aerating device 12. However, in cases where a trickling filter open to atmosphere is employed, the liquid is preferably applied in accordance with the teachings of Halvorson and Smith Patent No. 2,141,979 which contemplates application of the sewage to the filter at high daily average rates but at low distribution ratios to insure high percentage reduction in strength of readily susceptible material upon passage of the liquid through the filter.

In carrying out the process, the filter effluent returned to reservoir 2 through conduit 26 is subjected to an average period of detention of at least one day in the storage reservoir or lagoon 2 for the purpose of effecting conversion of a substantial part of the matter in said effluent which was not readily susceptible to treatment in the aerating device upon leaving the same, to a state in which it is readily susceptible to such treatment whereby a large percentage reduction in the strength of the effluent may take place each time it is recirculated through the aerating device. The liquid is subjected to an average period of detention of less than fifteen days before recirculation, however, in order to prevent the arising of objectionable odors arising from anaerobic conditions in the reservoir. As previously stated, the preferred period of such detention is from five to twelve days, particularly from seven to nine days.

The liquid may be retained in the system and recirculated any desired number of times and in practice it has been found that the percentage reduction in strength remains substantially constant for each recirculating and detention of the duration stated above, after the easily flocculated material in the primary influent has been removed. Therefore the process enables reduction of the strength of even very strong sewage to practically any desired degree down to a point at which it is considered safe to finally discharge the same into a stream or the like. The ratio of recirculated liquid to that finally discharged is of course adjusted so that the amount finally discharged equals the influent of raw sewage through conduit 7 under ordinary operating conditions. However, when periods of unusually large or small sewage production occur, the contents of reservoir or lagoon 2 may be varied within wide limits.

The following is a specific example of the treatment of waste by the process and system described above, it being noted that this example is merely illustrative and that various modifications may be made within wide ranges without departing from the scope of the invention:

The raw discharge of a yeast plant having a B. O. D. of from 3000 to 4000 and amounting to approximately 150,000 gallons per day, is given preliminary treatment to remove settable solids and then discharged into a storage reservoir or lagoon of approximately 20 million gallons capacity, which is maintained substantially full at all times and has a top surface of about 60 feet in diameter. Liquid is continuously withdrawn from the reservoir or lagoon at the rate of approximately 2 million gallons per day and applied to a trickling filter of standard construction employing crushed rock media, at a daily average rate of 30 m. g. a. d. (millions of gallons per acre per day) and at a distribution ratio as taught in the above mentioned Halvorson and Smith Patent No. 2,141,979. Of the filter effluent, 150,000 gallons per day are finally discharged and the remaining 1,850,000 gallons per day are returned to the storage reservoir or lagoon. The final effluent of this system has a constant strength of less than 100 B. O. D. which represents a reduction in strength of this originally high strength waste of around 97%.

In contradistinction to this result which was obtained by practicing the present invention, waste of the same strength and type from the same plant was rapidly recirculated through the filter several hundred times over the course of about one week without the prolonged detention periods between recirculations, and only approximately a 60% reduction in strength was obtained. And in the course of these recirculations, the percentage reduction in strength progressively declined until it was practically nil. The process of the present invention causes substantially the same percentage reduction in strength for each passage through the filter or the like, as a result of the prolonged detention periods between recirculations.

Considering now Figure 2, in which like parts are designated by like reference numerals, the system and process there disclosed differ from those disclosed in Figure 1 solely in the settling treatment given the filter effluent. In the system and process of Figure 2, that portion of the filter effluent which is returned to the storage reservoir is not subjected to treatment in the final settling tank 16' but is returned, together with its settable solids to the storage reservoir. Only that portion of the effluent finally discharged through conduit 24' has the settable solids removed therefrom in final settling tank 16'.

The settable solids in that portion of the filter returned to the reservoir of course settle out in the reservoir. Hence the process and system of Figure 2 preferably only used for treatment of seasonal waste so that the reservoir can be cleaned out between seasons. Of course, seasonal waste can also be treated in the system and according to the process of Figure 1, but the system of Figure 2 is less expensive to build due to the smaller capacity of the final settling tank.

In the flow diagrams of the drawing the incoming raw sewage is indicated as discharged into the reservoir for admixture with the filter effluent under detention, before application to the filter. If desired, the incoming raw sewage may be led directly to the filter and applied thereto without first undergoing detention in the reservoir. In fact, in some instances it will be desirable to lead the incoming raw sewage directly to the filter. In such case, however, the raw waste will be mixed with stored effluent drawn from the lagoon before applied to the filter.

Having described my invention, what I claim as new and desire to secure by Letters Patent of the United States is as follows:

1. The process for purifying strong sewage which includes repeatedly recirculating the sewage through an aerobic aerating device, and subjecting the sewage between passages through the aerating device to prolonged storage for an average period of not less than one day, nor more than fifteen days.

2. The process of treating sewage containing matter relatively susceptible to purification under aerobic action and matter relatively unsusceptible to aerobic action, which includes purifying the sewage by aerobic action through repeatedly circulating the sewage through an aerating device, and conditioning the sewage for aerobic action through storage and anaerobic action in mass between successive passages through the aerating device sufficiently prolonged, averaging not less than one day, to cause portions of the sewage which are relatively unsusceptible to aerobic action to be converted by anaerobic action to condition for purification during aeration.

3. The process of purifying strong sewage which includes introducing the sewage into a circuit including an aerobic aerating device and a large storage reservoir, purifying the sewage by repeatedly circulating it through the aerating device from and back to the storage reservoir, storing the sewage in the reservoir in such amount and circulating it at such rate to the aerating device that the sewage remains in prolonged storage in the reservoir for an average period of not less than one day nor more than fifteen days between successive circulations through the aerating device, withdrawing a portion only of the aerated sewage from the circuit in the course of circulation and returning the remaining portion of aerating sewage to the reservoir for further prolonged storage and subsequent repeated circulation through the aerating device.

4. A process of treating sewage having a B. O. D. in excess of approximately one thousand, which comprises repeatedly alternating holding the sewage in storage for more than a day and circulating the sewage through a trickling filter.

5. In a process of treating strong sewage by repeatedly circulating the sewage through an aerobic trickling filter and withdrawing portions only of the filter effluent during circulation, the step of converting initially relatively unoxidizable portions of the sewage to relatively oxidizable condition favorable to aerobic action through prolonged storage and anaerobic action for not less than a day of the filter effluent between successive passages through the trickling filter.

6. A process of treating strong sewage according to claim 5 wherein the prolonged storage is for a period of five to twelve days.

7. A process of providing strong sewage which includes continuously and repeatedly circulating the sewage between an aerobic aerator and a storage reservoir containing a mass of sewage so large in relation to the operating capacity of the aerator that aerated sewage returned to the reservoir from the aerator, also any new sewage supplied to the reservoir, will remain in storage and subject to anaerobic action for a period averaging at least one day between successive circulations through the aerator.

8. A process of providing strong sewage by repeated circulation through an aerobic aerator which comprises storing the sewage for a multiple of days to condition the same for aeration in a mass containing a multiple of the daily amount of sewage within the operating capacity of the aerator, and repeatedly circulating sewage from the mass in storage to the aerator and from the aerator back to the mass, whereby all sewage will be detained a multiple of days in storage between successive passages through the aerator.

9. A process of purifying strong sewage which includes continuously circulating the sewage through an aerobic aerating device from an accumulated mass of sewage so large in relation to the operating capacity of the aerating device that the maximum daily amount of sewage circulated is less than the total amount in storage, discharging a portion of the sewage after treatment in the aerating device, and conducting the remaining portion of the aerated sewage back to the mass for prolonged storage and anaerobic action and subsequent recirculation through the aerating device.

10. The process of purifying strong sewage which includes circulating the sewage repeatedly through an aerobic aerating device to and from a large capacity storage reservoir, and maintaining in the reservoir a mass of sewage so large in relation to the operating capacity of the aerating device and the rate of circulation between the reservoir and such device that the maximum daily amount of sewage circulated will constitute only a minor part of the total mass in storage and all the sewage will be subjected to prolonged storage in the reservoir between passages through the aerating device.

11. A process for treating a substantially continuous flow of strong industrial sewage in an aerobic aerating device which comprises circulating and recirculating the sewage through the aerating device and subjecting said sewage to storage for a period of more than one day between successive applications to the aerating device, while continuously withdrawing and finally discharging a portion of the aerating sewage.

12. A process for treating seasonal waste which comprises storing the waste in bulk for a period of detention of more than one day, and continually withdrawing a small portion only of the waste from storage, applying it to a trickling filter open to atmosphere, and discharging a portion of the effluent from the filter and returning the remainder of the effluent to the bulk of the waste for admixture therewith and further storage, and repeating said storing and filtration until desired reduction in B. O. D. of the waste has been obtained.

13. A process as claimed in claim 12 wherein at least seven per cent of the bulk waste is applied to the trickling filter each day.

14. A process for treating strong waste in a system including a large storage reservoir and a trickling filter open to atmosphere, which comprises passing a mixture of incoming raw sewage and filter effluent through the said trickling filter, returning the major portion of the filter effluent so produced to the reservoir while directly effecting final discharge of the remainder of said effluent without returning the same to the reservoir, and recirculating the effluent through the filter in admixture with incoming raw waste after a period of detention in the reservoir, the average period of detention of the sewage in the reservoir between applications to the trickling filter being from one to fifteen days so as to condition the relatively unsusceptible components of the said mixture for ready oxidation upon subquent filtration.

15. A process as claimed in claim 14 wherein the settlable solids are removed from at least that portion of the filter effluent which is finally discharged.

16. A process for treating strong waste in a system including a large storage reservoir, a trickling filter open to atmosphere which comprises discharging the incoming sewage into the reservoir, withdrawing sewage from the reservoir and passing it through said trickling filter, removing the settlable solids from all the effluent of said filter, and returning the major portion of the effluent with settlable solids removed to the reservoir while directly effecting final discharge of the remainder thereof, the average period of detention of the sewage in the reservoir between applications to the trickling filter being from one to fifteen days, whereby the relatively unsusceptible components of the said strong waste may be reduced by the microorganisms contained therein to a condition wherein they are readily susceptible of further purification through subsequent action of said trickling filter.

17. A process for treating strong waste in a system including a large storage reservoir, and a trickling filter open to atmosphere, which comprises removing the settlable solids from the incoming raw waste, discharging the raw waste free of settlable solids into the reservoir, withdrawing sewage from the reservoir and passing it through said trickling filter, and returning the major portion of the filter effluent to the reservoir while finally discharging the remainder of the filter effluent, the period of detention of the sewage in the reservoir between applications to the trickling filter being sufficient for substantial decomposition by bacterial action of those components thereof relatively unsusceptible of oxidation and render such components susceptible to ready oxidation upon subsequent filtration.

18. A system for treating strong industrial waste having a B. O. D. of more than approximately one thousand which comprises a large storage reservoir, a trickling filter open to atmosphere, means for withdrawing liquid from said reservoir and applying it to said filter, means for returning the major portion of the effluent from the filter to the reservoir for dilution of raw waste and support of aerobic bacterial action thereon, and means for effecting final discharge of the remainder of said filter effluent without return to the reservoir, said storage reservoir having a capacity at least equal to the amount of liquid applied to the filter daily, whereby the waste may be conditioned by aerobic and anaerobic microorganisms contained therein during the period of retention prior to application of the same to the filter.

19. A system for treating strong industrial waste having a B. O. D. of more than approximately one thousand, which comprises a large storage reservoir, a trickling filter open to atmosphere, a final settling tank, means for withdrawing liquid from the reservoir and applying it to the filter, means for conducting the filter effluent to the settling tank for removal of the settlable solids therefrom, and means for returning the major portion of the settling tank effluent to the reservoir while effecting a final discharge of a minor portion of said effluent without return to the reservoir, said storage reservoir having a capacity at least equal to the amount of liquid applied to the filter daily, whereby the waste may be acted upon during the period of retention by the anaerobic and aerobic microorganisms contained therein so as to cause the more efficient purification thereof upon application to the said trickling filter.

20. A system for treating strong industrial waste having a B. O. D. of more than approximately one thousand, which comprises a large storage reservoir, a trickling filter open to atmosphere, a primary settling tank, means for conducting incoming unsettled raw sewage to the primary settling tank for the removal of settlable solids therefrom, means for conducting the settled raw sewage from said tank to the reservoir, means for withdrawing liquid from the reservoir and applying it to the filter, and means for returning the major portion of the filter effluent to the reservoir while effecting final discharge of the minor portion of said effluent without return to said reservoir, said storage reservoir having a capacity at least equal to the amount of liquid applied to the filter daily, whereby the waste may be acted upon during the period of retention by the anaerobic and aerobic microorganisms contained therein so as to cause the more efficient purification thereof upon application to the said trickling filter.

21. A system for treating strong industrial waste having a B. O. D. of more than approximately one thousand, which comprises a primary settling tank, a large storage reservoir, a trickling filter open to atmosphere, a final settling tank, means for conducting incoming raw sewage to the primary settling tank for the removal of settlable solids therefrom, means for conducting the settled raw sewage from the primary settling tank to the storage reservoir, means for withdrawing liquid from the reservoir and applying it to the filter, means for conducting the filter effluent to the final settling tank for removal of the settlable solids therefrom, and means for returning the major portion of the settled effluent to the reservoir while effecting final discharge of the minor portion of said settled effluent without return to the reservoir, said storage reservoir having a capacity at least equal to the amount of liquid applied to the filter daily, whereby the waste may be acted upon during the period of retention by the anaerobic and aerobic microorganisms contained therein so as to cause the more efficient purification thereof upon application to the said trickling filter.

22. A system for treating strong industrial sewage having a B. O. D. of more than one thousand, which comprises means for removing the settlable solids from incoming unsettled raw sewage, a trickling filter open to atmosphere, a large storage reservoir of sufficient capacity to hold incoming sewage and sewage effluent returned from the filter in storage for a conditioning period of at least a day preliminary to delivery to the filter, means for conducting a portion of the sewage from the reservoir to the filter for filtration, means for conducting a major portion of the effluent from the filter after filtration to the reservoir, means for applying such effluent from the reservoir and settled raw sewage from said removing means to the filter, means for finally discharging a minor portion of the filter effluent without return to the reservoir, and means for removing the settlable solids from at least said portion of the filter effluent which is finally discharged.

H. ORIN HALVORSON.

REFERENCES CITED

The following references are of record in the file of this patent:

UNITED STATES PATENTS

| Number | Name | Date |
| --- | --- | --- |
| 978,889 | Imhoff | Dec. 20, 1910 |
| 1,437,394 | Brown | Dec. 5, 1922 |
| 2,065,123 | Downes | Dec. 22, 1936 |
| 2,090,405 | Shook | Aug. 17, 1937 |
| 2,097,779 | Shook | Nov. 2, 1937 |
| 2,141,979 | Halvorson et al. | Dec. 27, 1938 |
| 2,142,196 | Langdon | Jan. 3, 1939 |
| 2,168,208 | Jenks | Aug. 1, 1939 |
| 2,258,398 | Ward | Oct. 7, 1941 |

FOREIGN PATENTS

| Number | Country | Date |
| --- | --- | --- |
| 1,641 | Great Britain | Jan. 24, 1899 |
| 19,197 | Great Britain | Sept. 23, 1899 |
| 188,958 | Great Britain | Nov. 23, 1922 |

OTHER REFERENCES

"The Biofiltration Process of Sewage Treatment," by Dr. A. J. Fischer and R. B. Thompson. Water and Sewage, May 1940, pages 16, 38–41, 51 and 52.

"Experimental Studies of Biofiltration," by H. N. Jenks. Sewage Works Journal, vol. VIII, No. 3, May 1936, pages 401–414.

"Biofiltration of Sewage," by H. N. Jenks. Engineering News-Record, May 21, 1936, pages 721–725.